United States Patent
Heubel et al.

(10) Patent No.: US 8,963,882 B2
(45) Date of Patent: *Feb. 24, 2015

(54) MULTI-TOUCH DEVICE HAVING DYNAMIC HAPTIC EFFECTS

(71) Applicant: Immersion Corporation, San Jose, CA (US)

(72) Inventors: Robert W. Heubel, San Leandro, CA (US); Danny A. Grant, Laval (CA)

(73) Assignee: Immersion Corporation, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/956,622

(22) Filed: Aug. 1, 2013

(65) Prior Publication Data

US 2013/0314354 A1 Nov. 28, 2013

Related U.S. Application Data

(63) Continuation of application No. 13/324,350, filed on Dec. 13, 2011, now Pat. No. 8,542,216, and a continuation of application No. 11/863,741, filed on Sep. 28, 2007, now Pat. No. 8,098,235.

(51) Int. Cl.
*G06F 3/045* (2006.01)
*G06F 3/01* (2006.01)
*G06F 3/0488* (2013.01)

(52) U.S. Cl.
CPC ............ *G06F 3/016* (2013.01); *G06F 3/04883* (2013.01); *G06F 2203/04808* (2013.01)
USPC .......................................... 345/174; 345/156

(58) Field of Classification Search
CPC ......... G06F 3/01; G06F 3/016; G06F 3/0414; G06F 3/044; G06F 3/045; G06F 3/04883
USPC .................... 345/156–179; 178/18.01–18.09, 178/19.01–19.06, 20.01–20.04
See application file for complete search history.

(56) References Cited

U.S. PATENT DOCUMENTS

| | | | |
|---|---|---|---|
| 6,337,678 B1 | 1/2002 | Fish | |
| 6,819,312 B2 | 11/2004 | Fish | |
| 7,084,859 B1 | 8/2006 | Pryor | |
| 7,812,826 B2 * | 10/2010 | Ording et al. | 345/173 |
| 8,098,235 B2 | 1/2012 | Heubel et al. | |
| 8,451,245 B2 | 5/2013 | Heubel et al. | |
| 8,542,216 B2 * | 9/2013 | Heubel et al. | 345/174 |

(Continued)

FOREIGN PATENT DOCUMENTS

| | | |
|---|---|---|
| AU | 2007100826 A4 | 9/2007 |
| JP | 2006058973 A | 3/2006 |

(Continued)

OTHER PUBLICATIONS

Angela Chang et al., "ComTouch: Design of a Vibrotactile Communication Device", DIS2002, London © Copyright 2002 ACM 1-58113-2-9-0/00/0008, 10 Pages.

(Continued)

*Primary Examiner* — Vijay Shankar
(74) *Attorney, Agent, or Firm* — Miles & Stockbridge P.C.

(57) ABSTRACT

A system for generating haptic effects senses at least two generally simultaneous touches on a touchscreen and, in response, generates a dynamic haptic effect.

18 Claims, 3 Drawing Sheets

(56) References Cited

U.S. PATENT DOCUMENTS

| | | |
|---|---|---|
| 2002/0044132 A1 | 4/2002 | Fish |
| 2006/0026536 A1 | 2/2006 | Hotelling et al. |
| 2006/0119586 A1 | 6/2006 | Grant et al. |
| 2006/0197752 A1 | 9/2006 | Hurst et al. |
| 2008/0180406 A1 | 7/2008 | Han et al. |
| 2008/0216001 A1 | 9/2008 | Ording et al. |
| 2009/0256817 A1 | 10/2009 | Perlin et al. |
| 2010/0149134 A1 | 6/2010 | Westerman et al. |
| 2010/0265208 A1 | 10/2010 | Kim et al. |
| 2010/0313124 A1 | 12/2010 | Privault et al. |
| 2010/0328053 A1 | 12/2010 | Yeh et al. |
| 2011/0043527 A1 | 2/2011 | Ording et al. |
| 2012/0081326 A1 | 4/2012 | Heubel et al. |

FOREIGN PATENT DOCUMENTS

| | | |
|---|---|---|
| JP | 2008508600 A | 3/2008 |
| JP | 2010541071 A | 12/2010 |
| WO | 2006020304 A2 | 2/2006 |
| WO | 2006020305 A2 | 2/2006 |
| WO | 2006042309 A1 | 4/2006 |

OTHER PUBLICATIONS

Bill Buxton, "Multi-Touch Systems that I Have Known and Loved", Microsoft Research, Original: Jan. 12, 2007, Version: Jul. 17, 2007, http://www.billbuxton.com/multitouchOverview.html, pp. 1-16.
International Search Report of PCT Application No. PCT/US2008/076343, Mailing Date: Dec. 16, 2008.

* cited by examiner

MULTI-TOUCH DEVICE HAVING DYNAMIC HAPTIC EFFECTS

CROSS-REFERENCE TO RELATED APPLICATIONS

This application is a continuation of U.S. patent application Ser. No. 13/324,350, filed on Dec. 13, 2011, the specification of which is hereby incorporated by reference. U.S. patent application Ser. No. 13/324,350 is a continuation of U.S. patent application Ser. No. 11/863,741, filed on Sep. 28, 2007, the specification of which is also hereby incorporated by reference.

FIELD OF THE INVENTION

One embodiment of the present invention is directed to haptic effects. More particularly, one embodiment of the present invention is directed to haptic effects for a multi-touch touchscreen device.

BACKGROUND INFORMATION

Electronic device manufacturers strive to produce a rich interface for users. Conventional devices use visual and auditory cues to provide feedback to a user. In some interface devices, kinesthetic feedback (such as active and resistive force feedback) and/or tactile feedback (such as vibration, texture, and heat) is also provided to the user, more generally known collectively as "haptic feedback" or "haptic effects". Haptic feedback can provide cues that enhance and simplify the user interface. Specifically, vibration effects, or vibrotactile haptic effects, may be useful in providing cues to users of electronic devices to alert the user to specific events, or provide realistic feedback to create greater sensory immersion within a simulated or virtual environment.

Haptic feedback has also been increasingly incorporated in portable electronic devices, such as cellular telephones, personal digital assistants (PDAs), portable gaming devices, and a variety of other portable electronic devices. For example, some portable gaming applications are capable of vibrating in a manner similar to control devices (e.g., joysticks, etc.) used with larger-scale gaming systems that are configured to provide haptic feedback. Additionally, devices such as cellular telephones and PDAs are capable of providing various alerts to users by way of vibrations. For example, a cellular telephone can alert a user to an incoming telephone call by vibrating. Similarly, a PDA can alert a user to a scheduled calendar item or provide a user with a reminder for a "to do" list item or calendar appointment.

Increasingly, portable devices are moving away from physical buttons in favor of touchscreen-only interfaces. This shift allows increased flexibility, reduced parts count, and reduced dependence on failure-prone mechanical buttons and is in line with emerging trends in product design. When using the touchscreen input device, a mechanical confirmation on button press or other user interface action can be simulated with haptic effects. Further, many devices are now capable of multi-touch in which a touchscreen recognizes multiple simultaneous touch points and includes software to interpret simultaneous touches.

Based on the foregoing, there is a need for a system and method for generating haptic effects for a multi-touch device.

SUMMARY OF THE INVENTION

One embodiment is a multi-touch device that includes a touchscreen, a processor coupled to the touchscreen, and a haptic feedback system coupled to the processor. The processor is adapted to sense at least two generally concurrent touches on a touchscreen. The processor is adapted to generate through the haptic feedback system a dynamic haptic effect in response to the sensing. The dynamic haptic effect is a vibration that comprises a variation of at least one parameter.

DETAILED DESCRIPTION

One embodiment is touchscreen multi-touch device that includes a haptic feedback system for generating dynamic haptic effects in response to multi-touches.

Figure 1:
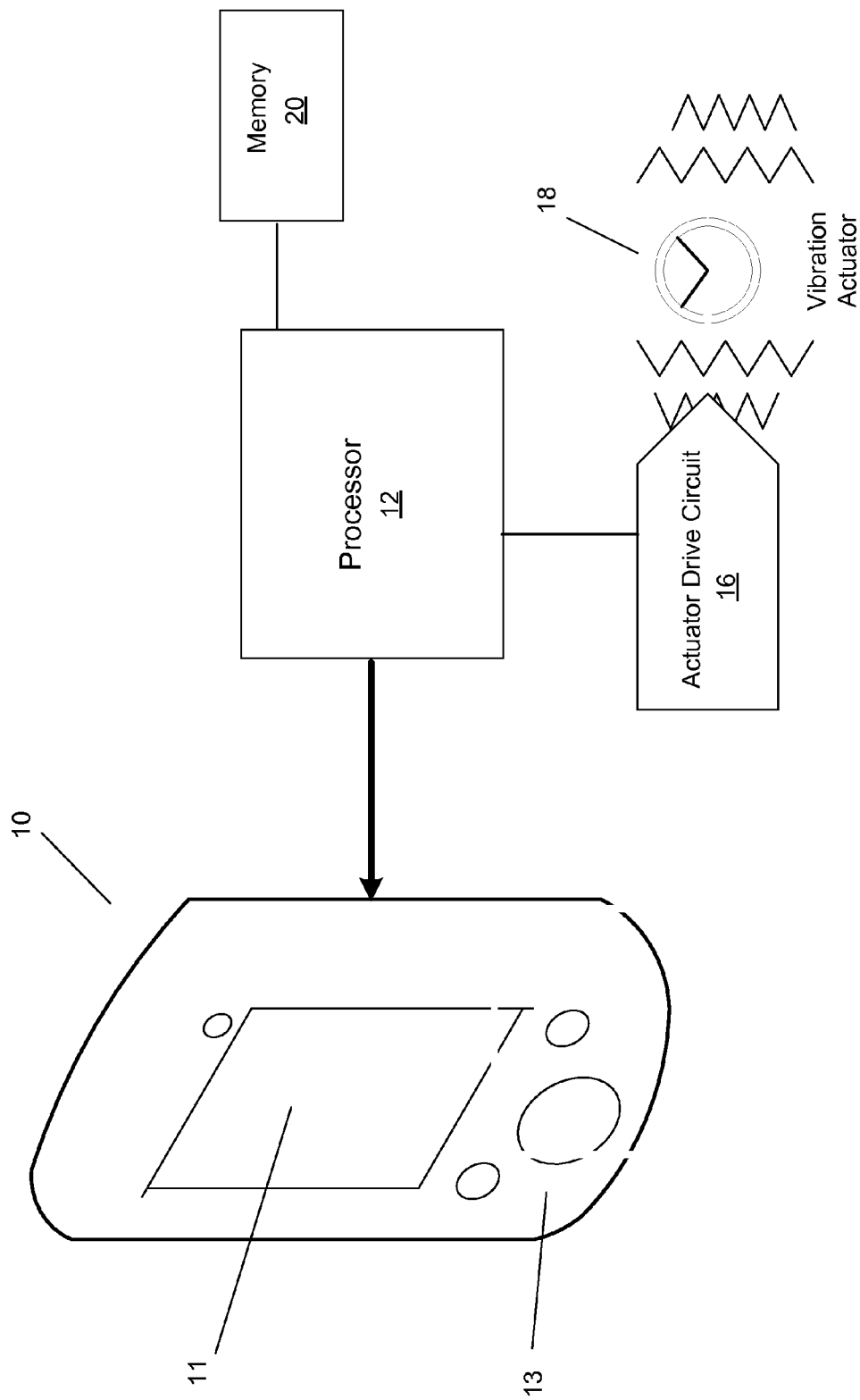
FIG. 1 is a block diagram of a cellular telephone in accordance with one embodiment.

FIG. 1 is a block diagram of a cellular telephone 10 in accordance with one embodiment. Telephone 10 includes a touchscreen 11 and may include mechanical keys/buttons 13. Internal to telephone 10 is a haptic feedback system that generates vibrations on telephone 10. In one embodiment, the vibrations are generated on the entire telephone 10. In other embodiments, specific portions of telephone 10 can be haptically enabled by the haptic feedback system, including the entire touchscreen 11 or individual portions of touchscreen 11.

The haptic feedback system includes a processor 12. Coupled to processor 12 is a memory 20 and an actuator drive circuit 16, which is coupled to a vibration actuator 18. Processor 12 may be any type of general purpose processor, or could be a processor specifically designed to provide haptic effects, such as an application-specific integrated circuit ("ASIC"). Processor 12 may be the same processor that operates the entire telephone 10, or may be a separate processor. Processor 12 can decide what haptic effects are to be played and the order in which the effects are played based on high level parameters. In general, the high level parameters that define a particular haptic effect include magnitude, frequency and duration. Low level parameters such as streaming motor commands could also be used to determine a particular haptic effect. A haptic effect may be considered "dynamic" if it includes some variation of these parameters when the haptic effect is generated or a variation of these parameters based on a user's interaction.

Processor 12 outputs the control signals to drive circuit 16 which includes electronic components and circuitry used to supply actuator 18 with the required electrical current and voltage to cause the desired haptic effects. Actuator 18 is a haptic device that generates a vibration on telephone 10. Actuator 18 can include one or more force applying mechanisms which are capable of applying a vibrotactile force to a user of telephone 10 (e.g., via the housing of telephone 10). Actuator 18 may be, for example, an electromagnetic actuator, an Eccentric Rotating Mass ("ERM") in which an eccentric mass is moved by a motor, a Linear Resonant Actuator ("LRA") in which a mass attached to a spring is driven back and forth, or a "smart material" such as piezoelectric, electro-active polymers or shape memory alloys. Memory device 20 can be any type of storage device or computer-readable medium, such as random access memory ("RAM") or readonly memory ("ROM"). Memory 20 stores instructions executed by processor 12. Memory 20 may also be located internal to processor 12, or any combination of internal and external memory.

Touchscreen 11 recognizes touches, as well as the position and magnitude of touches on a touch sensitive surface. The data corresponding to the touches is sent to processor 12, or another processor within telephone 10, and processor 12 interprets the touches and in response generates haptic effects. Touchscreen 11 may sense touches using any sensing technology, including capacitive sensing, resistive sensing, surface acoustic wave sensing, pressure sensing, optical sensing, etc. Touchscreen 11 can sense multi-touch contacts and is capable of distinguishing multiple touches that occur at the same time. Touchscreen 11 may further display images for the user to interact with, such as keys, dials, etc., or may be a touchpad with minimal or no images.

Although the embodiment of FIG. 1 is a cellular telephone 10, other embodiments may be any type of device that includes one or more touchscreens that is capable of accommodating multi-touch. The generally simultaneous or concurrent multiple touches may occur on a single touchscreen, or may occur on two different touchscreens at the same time. The touches may be from a user's finger, a stylus, or from any other object.

Figure 2:
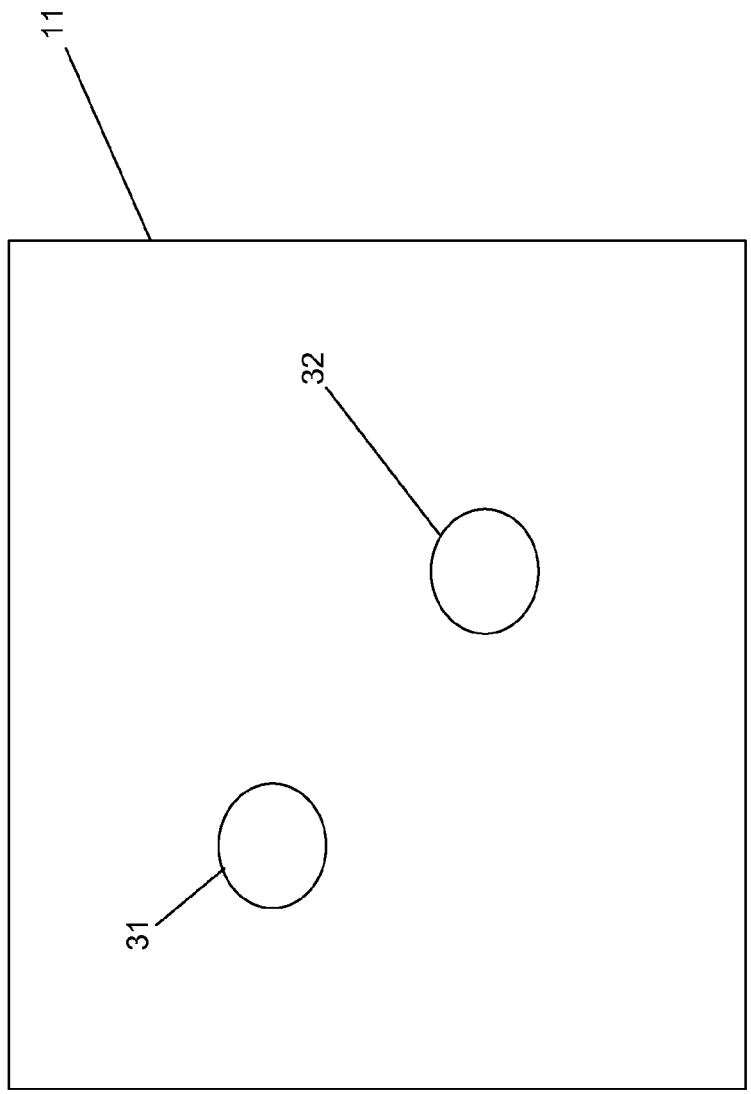
FIG. 2 is a block diagram of a touchscreen and indicates two contact points where a multi-touch contact has occurred.

FIG. 2 is a block diagram of touchscreen 11 and indicates two contact points 31, 32 where a multi-touch contact has occurred. In one embodiment, processor 12 generates dynamic haptic effects based on a number of possible factors associated with contact points 31 and 32. For example, the haptic effects may be based, at least in part, by the distance between contact points, the direction of motion of the contact points, the number of contact points (e.g., if there are more than two contact points), the screen position of the contact points, the function being initiated by the contact points, the amount of pressure being applied at each contact point, etc.

Figure 3:
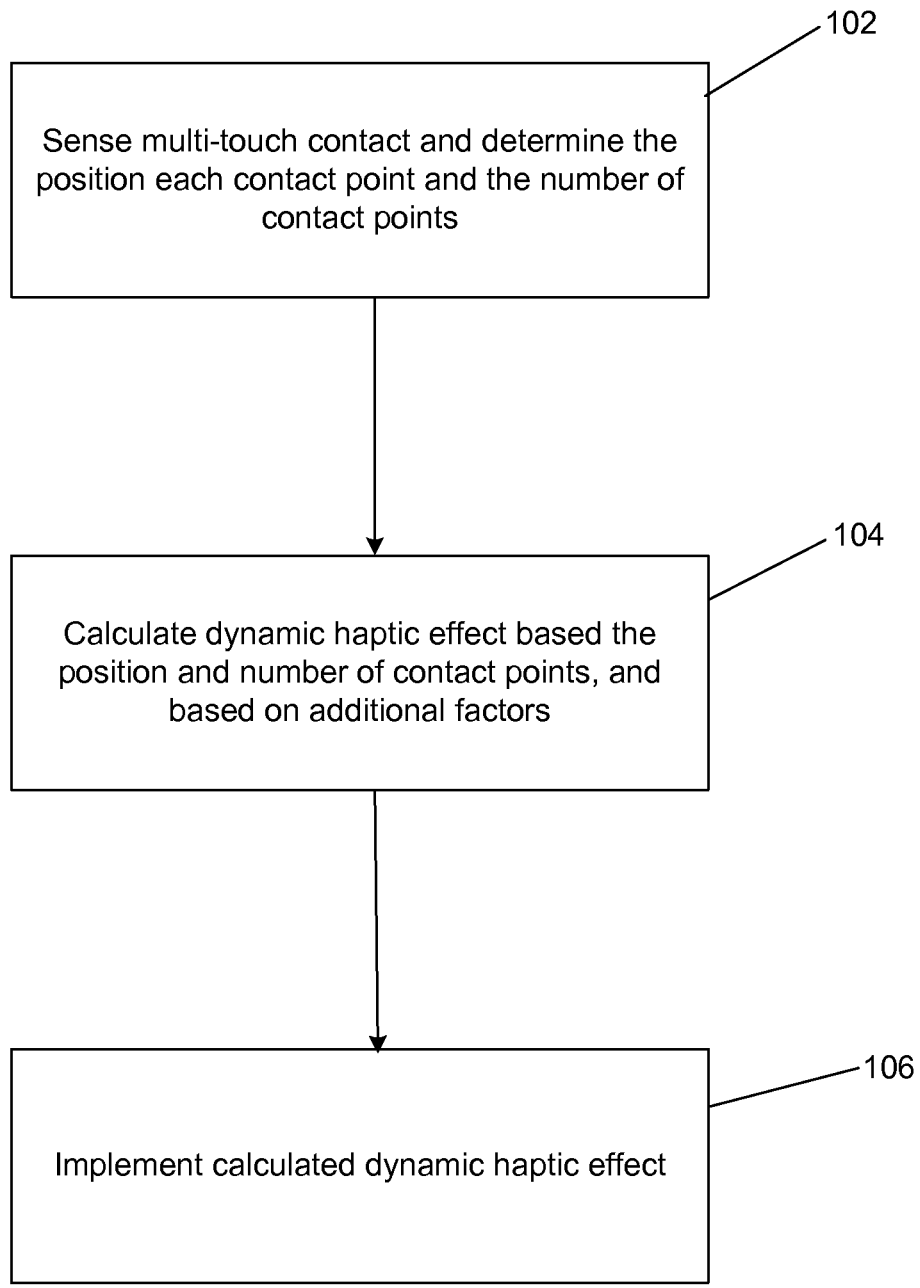
FIG. 3 is a flow diagram of the functionality performed by the telephone of FIG. 1 in response to multi-touch contact on the touchscreen.

FIG. 3 is a flow diagram of the functionality performed by telephone 10 of FIG. 1 in response to multi-touch contact on touchscreen 11. In one embodiment, the functionality of FIG. 3 is implemented by software stored in memory and executed by a processor 12. In other embodiments, the functionality can be performed by hardware, or any combination of hardware and software.

At 102, the multi-touch contact is sensed and the position each contact point and the number of contact points is determined.

At 104, a dynamic haptic effect is calculated based the position and number of contact points, and based on any number of other factors such as the factors disclosed above (e.g., distance between points, direction of motion of points, etc.). The haptic effect is dynamic in that one or more parameters such as amplitude, vibration, frequency, etc. are varied over time. The dynamic nature of the haptic effect provides additional information to the user in contrast to static haptic effects. The need to provide additional information increases as two or more generally simultaneously touches are sensed on a multi-touch device. In one embodiment, multiple dynamic haptic effects may be calculated, one for each contact point, so that each contact object (e.g., each finger) may experience a different haptic effect rather than a single dynamic haptic effect that is applied to the entire telephone 10 or touchscreen 11.

At 106, the calculated dynamic haptic effect at 104 is output to drive circuit 16 and actuator 18 so that the effect is implemented in the form of vibrations or other haptics.

In operation, embodiments creates dynamic haptic effects in response to multi-touch contacts to enhance the functionality and usability of telephone 10. For example, when the multi-touch contacts are two or more fingers, a user may be able to move their fingers apart while touching or in close proximity to touchscreen 11 in order to zoom in on a displayed image. In response, a dynamic haptic effect can be generated that increases in amplitude or frequency to communicate the sensation of a growing or increasing virtual window or object size and/or volume. The action of bringing the fingers back together can result in an equal and opposite decreasing amplitude or frequency to communicate the sensation of a shrinking or decreasing virtual window or object size and/or volume.

In another example, two or more fingers may be moved apart for the purpose of moving through a displayed list of contacts, text, or menu items and in response a dynamic haptic effect of increasing amplitude or frequency may be generated that is based on the distance between the finger points. The further apart the user's fingers are, the greater the amplitude or frequency of the haptic effects would be in order to communicate the sensation of increasing speed or movement through the list of contacts or menu items. The action of bringing the fingers back together would result in an equal and opposite decreasing amplitude, or frequency to communicate the sensation of a decreasing speed or movement through the list of contacts or menu items.

Further, two or more fingers can make a rotating gesture equivalent to turning a virtual knob on touchscreen 11. In response, dynamic haptic effects can be generated as the virtual knob is turned to simulate those sensations felt in turning a mechanical knob such as detents and barriers. Other dynamic effects can be generated that are not typically associated with a rotary knob but provide information such as scroll-rate control, end-of-list/top-of-list notifications, etc.

In another embodiment, two or more fingers may set a boundary box (selection area) that allows the user to interact with all virtual grasped items contained in the bounded box. While sliding the bounded box, dynamic haptic effects may generate a sliding feeling and can vary depending on the speed of the dragging or how far the box is being dragged. Further, the interaction of resizing the items by increasing or decreasing the distance between two fingers may generate an equivalent dynamic haptic effect of increasing or decreasing amplitude or frequency, or a haptic effect of consistent amplitude and frequency that communicates the action of relative increasing or decreasing object sizes. Further, the interaction of rotating the grasped items by rotating fingers clockwise or counter-clockwise may generate an equivalent dynamic haptic event of increasing or decreasing haptic amplitude or frequency, or a haptic effect of consistent amplitude and frequency that communicates the action of rotating the object (s) away from their initial starting location or virtual setting. Further, the interaction of dragging the items by moving the fingers across the screen may generate an equivalent dynamic haptic effect of increasing or decreasing haptic amplitude or frequency, or a haptic effect of consistent amplitude and frequency that communicates the action of physically dragging the object(s) away from their initial starting location or virtual setting.

In another embodiment, telephone 10 includes a foot pedal or switch so that a user can use one foot to control a pedal button/switch while manipulating a touchscreen to interact with virtual objects. In one embodiment, the foot pedal's button action could be used in the same way a mouse button click could be used for anchoring a cursor point. The user's hands would then be free to manipulate a touchscreen and performing functions such as activating, navigating, resizing, reshaping, moving, combining of menus, menu items, windows, virtual shapes or virtual objects. Each of these interactions could have a dynamic haptic effect triggered at the same time to better communicate these interactions in the absence of real mechanical buttons, switches, or the actual physical objects being represented.

In another embodiment, multiple users may apply multi-touch contacts to touchscreen 11 and each user may need different haptic effects based on the specific application or interaction they are making at any given moment in time. Further, a single, multi-hand user may need different haptic effects for each hand based on the specific actions each hand is making at any given moment. For example, one hand may be using two fingers to grab or pinch a virtual object while the other hand is using two fingers to manipulate the virtual object or to zoom in/out or even scroll through a separate menu list. Both actions may be happening simultaneously on the same surface and benefit from different dynamic haptic effects being generated at each hand.

As disclosed, embodiments generate dynamic haptic effects in response to multi-touch interactions on a touchscreen. As a result, a user can more easily and more effectively make use of functionality of a touchscreen multi-touch device.

Several embodiments are specifically illustrated and/or described herein. However, it will be appreciated that modifications and variations are covered by the above teachings and within the purview of the appended claims without departing from the spirit and intended scope of the invention.

What is claimed is:

1. A multi-touch device comprising:
a touchscreen;
a processor coupled to the touchscreen; and
a haptic feedback system coupled to the processor;
wherein the processor is configured to sense at least two generally simultaneous touches on a touchscreen;
wherein the processor is configured to generate through the haptic feedback system a dynamic haptic effect in response to the sensing; and
wherein the dynamic haptic effect is a vibration that comprises a variation of at least one parameter that is based on a user interaction with the touchscreen.

2. The multi-touch device of claim 1, wherein the haptic feedback system comprises at least one actuator.

3. The multi-touch device of claim 1, wherein the sensing comprises determining a location of the touches.

4. The multi-touch device of claim 1, wherein the sensing comprises determining a number of touches on the touchscreen.

5. The multi-touch device of claim 1, wherein the at least one parameter is one or more of amplitude, frequency and duration.

6. The multi-touch device of claim 1, wherein the dynamic haptic effect is generated substantially solely at points of contact of the touches on the touchscreen.

7. A computer readable medium having instructions stored thereon that, when executed by a processor, causes the processor to:
sense at least two generally simultaneous touches on a touchscreen; and
generate a dynamic haptic effect in response to the sensing;
wherein the dynamic haptic effect is a vibration that comprises a variation of at least one parameter that is based on a user interaction with the touchscreen.

8. A system for generating haptic effects comprising:
means for sensing at least two generally simultaneous touches on a touchscreen; and
means for generating a dynamic haptic effect in response to the sensing;
wherein the dynamic haptic effect is a vibration that comprises a variation of at least one parameter that is based on a user interaction with the touchscreen.

9. A method of generating haptic effects comprising:
sensing at least two generally simultaneous touches on a touchscreen; and
generating a dynamic haptic effect in response to the sensing;
wherein the dynamic haptic effect is a vibration that comprises a variation of at least one parameter that is based on a user interaction with the touchscreen.

10. The method of claim 9, wherein the sensing comprises determining a location of the touches.

11. The method of claim 9, wherein the sensing comprises determining a number of touches on the touchscreen.

12. The method of claim 9, wherein the at least one parameter is one or more of amplitude, frequency and duration.

13. The method of claim 9 wherein the dynamic haptic effect is generated by at least one actuator.

14. The method of claim 9, wherein the sensing comprises a first determination that a first finger and a second finger are being moved apart, and the dynamic haptic effect comprises increasing the parameter.

15. The method of claim 14, wherein the sensing comprises a second determination that the first finger and a second finger are being moved together, and the dynamic haptic effect comprises decreasing the parameter.

16. The method of claim 9, wherein the sensing comprises a determination that a first finger and a second finger are being rotated, and the dynamic haptic effect comprises generating a detent simulation from the variation.

17. The method of claim 9, wherein the sensing comprises a determination that a first finger and a second finger created a boundary box and the box is being dragged, wherein the dynamic haptic effect comprises generating a dragging speed indication from the variation.

18. The method of claim 9, wherein the dynamic haptic effect is generated substantially solely at points of contact of the touches.

* * * * *